(12) United States Patent
Igarashi et al.

(10) Patent No.: US 7,519,367 B2
(45) Date of Patent: Apr. 14, 2009

(54) HANDOVER CONTROL APPARATUS, RADIO TERMINAL DEVICE, EDGE ROUTER, ROUTER, MOBILE COMMUNICATION SYSTEM, AND HANDOVER CONTROL METHOD

(75) Inventors: Ken Igarashi, Yokohama (JP); Atsushi Iwasaki, Yokosuka (JP); Shinichi Isobe, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 888 days.

(21) Appl. No.: 10/416,339

(22) PCT Filed: Sep. 12, 2002

(86) PCT No.: PCT/JP02/09369

§ 371 (c)(1),
(2), (4) Date: May 12, 2003

(87) PCT Pub. No.: WO03/026336

PCT Pub. Date: Mar. 27, 2003

(65) Prior Publication Data

US 2004/0063429 A1    Apr. 1, 2004

(30) Foreign Application Priority Data

Sep. 12, 2001    (JP) .......................... P2001-277127

(51) Int. Cl.
*H04Q 7/20*    (2006.01)
*H04B 7/212*    (2006.01)

(52) U.S. Cl. .................. 455/436; 455/445; 455/442; 455/437

(58) Field of Classification Search ................. 455/445, 455/436, 442, 439, 432.1, 444, 560, 437, 455/438; 370/328–350
See application file for complete search history.

(56) References Cited

U.S. PATENT DOCUMENTS 6,434,134 B1 *  8/2002  La Porta et al. ............. 370/338
7,158,497 B2 *  1/2007  Li et al. ...................... 370/331

FOREIGN PATENT DOCUMENTS

| EP | 0 993 155 A | 4/2000 |
| EP | 1 011 243 A | 6/2000 |
| JP | 02-206237 | 8/1990 |
| JP | 7-312770 | 11/1995 |
| JP | 11-55721 | 2/1999 |
| JP | 2000-78165 | 3/2000 |
| JP | 2000-324169 | 11/2000 |
| JP | 2000-341330 | 12/2000 |
| JP | 2001-45534 | 2/2001 |
| WO | 00/11878 | 3/2000 |
| WO | 02/19615 A | 3/2002 |

* cited by examiner

*Primary Examiner*—Melur Ramakrishnaiah
(74) *Attorney, Agent, or Firm*—Oblon, Spivak, McClelland, Maier & Neustadt, P.C.

(57) ABSTRACT

In a configuration provided with routers 118-126 and gateway device 130 connected above edge routers 102-116 provided in respective base stations in a hierarchical structure and configured to perform relaying of data to the base stations, a router 126 is specified as a relay router, which is a COR closer to a radio terminal unit out of CORs where all paths from an edge router 104 before movement of the radio terminal unit 100 and from each of all edge routers 102, 106 as destination candidates to CN 132 of a communication correspondent intersect. This makes it feasible to readily decrease the handover transaction time.

25 Claims, 5 Drawing Sheets

US 7,519,367 B2

HANDOVER CONTROL APPARATUS, RADIO TERMINAL DEVICE, EDGE ROUTER, ROUTER, MOBILE COMMUNICATION SYSTEM, AND HANDOVER CONTROL METHOD

TECHNICAL FIELD

The present invention relates to a handover control apparatus, a mobile communication system, and a handover control method configured to specify a relay router to be provided with the RR (Regional Registration) function, out of CORs (Cross Over Routers) under which edge routers provided in respective base stations for radio communication with radio terminal unit such as cellular phones and the like are connected, so as to preliminarily route an invariable path even after a handover, thereby decreasing a time period of the handover.

BACKGROUND ART

FIG. 4 is a block diagram for explaining the general handover operation in the conventional mobile communication systems.

This mobile communication system shown in FIG. 4 is comprised of a plurality of base stations 16, 18, 20, 22 for radio communication with radio terminal units 12, 14 such as cellular phones, a plurality of routers 24, 26 connected above each of the base stations 16-22, a gateway device 28 connected above each of the routers 24, 26, and a CN (Correspondent Node) 30 which is a communication terminal unit of a correspondent party connected through a communication network to the gateway device 28.

In this configuration, where there is an overlap zone, i.e., where radio zones overlap each other as in the case of a radio zone 32 formed by radio waves of the base station 16 and a radio zone 34 of the base station 18, the radio terminal unit 12 presently under communication with the base station 16 evaluates the condition of radio waves from the destination base station 18 and initiates a handover transaction.

First, the radio terminal unit 12 transmits a movement notification message, as indicated by an arrow Y1, through the destination base station 18, router 24, and gateway device 28 to the CN 30 of the communication correspondent. In response thereto the CN 30 transmits an acknowledgment as indicated by an arrow Y2 and the radio terminal unit receives the acknowledgment and thereafter receives data packets transmitted from the CN 30.

On the other hand, where there is no overlap zone, as in the case of a radio zone 36 of the base station 20 and a radio zone 38 of the base station 22, the radio terminal unit 14 first detects fade away of a radio link with the base station 20 where it is presently registered, and thereafter initiates a handover transaction.

First, the radio terminal unit 14 transmits a movement notification message, as indicated by an arrow Y3, through the destination base station 22, router 26, and gateway device 28 to the CN 30 of the communication correspondent. In response thereto the CN 30 transmits an acknowledgment as indicated by an arrow Y4, and the radio terminal unit receives the acknowledgment and then receives data packets transmitted from the CN 30 of the communication correspondent.

In the case where there exists an overlap zone as described above, if the handover transaction takes a long time and results in failure in handover within the overlap zone, there will occur a short break of communication because of failure in update of the path to the destination. In the case where there is no overlap zone, if the handover transaction takes a long time after the movement to the new base station 22, there will occur a short break of communication as long as the time taken. In either case, a significant element for improvement in performance is to keep the time for the handover transaction as short as possible. The time period of the handover transaction is largely dependent upon the time for detection of the new base station and the time for the update of the path to the communication correspondent.

Therefore, IETF presents the following technique of reducing the time period of the handover transaction, as shown in FIG. 5: relay routers 24a, 26a are introduced into the domain and movement under command of the relay routers 24a, 26a is supported by change of location registration in the relay routers 24a, 26a.

The operation in this case will be described. First, as indicated by an arrow Y10, suppose the radio terminal unit 12 has moved from the edge router 16a to the edge router 18a. In this case, since the previous and new edge routers 16a, 18a both are connected to the relay router 24a, the movement is one under command of the relay router 24a and thus the radio terminal unit 12 transmits a location update request to the relay router 24a as indicated by an arrow Y11.

In response thereto, the relay router 24a performs path rerouting. Namely, the relay router 24a performs path rerouting from a path 42 of connection between the relay router 24a and the edge router 16a to a path 44 of connection between the relay router 24a and the edge router 18a. At this time, no change is made in a path 46 of connection between the CN 30 and the relay router 24a.

Next, suppose the radio terminal unit 12 has moved from the edge router 18a to the edge router 20a as indicated by an arrow Y12. In this case, since there is the difference between the relay routers connected to the previous edge router 18a and to the new edge router 20a, i.e., between 24a and 26a, the radio terminal unit 12 notifies the CN 30 of the communication correspondent of the change of the relay router to 26a, as indicated by an arrow Y13.

In response thereto, the path from the CN 30 through the gateway device 28 to the relay router is rerouted from the path 46 of connection between the CN 30 and the relay router 24a to a path 48 of connection between the CN 30 and the relay router 26a, and a path from the relay router 26a to the radio terminal unit 12 has to be a path 50 of connection from the relay router 26a through the edge router 20a to the radio terminal unit 12. Namely, all the paths from the CN 30 to the radio terminal unit 12 need to be rerouted.

In the case of the conventional method, as described above, only when the radio terminal unit moves between the edge routers 16a, 18a under the same relay router 24a, there is no need for notification of update of location registration to the CN 30 of the communication correspondent and the time necessary for the handover transaction can be reduced thereby.

DISCLOSURE OF THE INVENTION

In the above conventional handover control method, when the radio terminal unit 12 moves between the relay routers 24a, 26a, a location change notification has to be sent to the CN 30 of the communication correspondent at the time of handover after all and this poses the problem of increase in the time period of the handover transaction.

An object of the present invention is therefore to provide a handover control apparatus, a radio terminal unit, an edge router, a router, a mobile communication system, and a handover control method capable of readily decreasing the handover transaction time by obviating the need for the path rerouting up to CN 30 of the communication correspondent at the time of handover.

In order to solve the above problem, a handover control apparatus of the present invention is a handover control apparatus for controlling handover of a radio terminal unit between edge routers which are provided in respective base stations for radio communication with radio terminal unit and to which routers are connected above in a hierarchical structure, the handover control apparatus comprising: control means for specifying a relay router out of CORs where all paths from an edge router before movement of the radio terminal unit and from every edge router as a candidate for a destination of the movement to a communication correspondent intersect.

In order to solve the above problem, a mobile communication system of the present invention is a mobile communication system for implementing handover of a radio terminal unit between base stations, the mobile communication system comprising: routers connected above the base stations in a hierarchical structure and configured to perform relaying of data to the base stations; and edge routers provided in the respective base stations, each edge router being configured to specify a relay router out of CORs where all paths from a base station before movement of the radio terminal unit and from every base station as a candidate for a destination of the movement to a communication correspondent intersect.

In order to solve the above problem, a handover control method of the present invention is a handover control method of controlling handover of a radio terminal unit between edge routers which are provided in respective base stations for radio communication with radio terminal unit and to which routers are connected above in a hierarchical structure, the handover control method comprising: a control step of specifying a relay router out of CORs where all paths from an edge router before movement of the radio terminal unit and from every edge router as a candidate for a destination of the movement to a communication correspondent intersect.

This configuration makes it feasible to specify the common relay router to the edge router currently under connection with the radio terminal unit and every edge router as a destination candidate, whereby the handover can be performed by only sending the location change notification to the thus specified relay router. Namely, the handover can be performed without sending the location change notification up to the communication correspondent as before, so that the time period of the handover transaction can be readily reduced.

BEST MODE FOR CARRYING OUT THE INVENTION

An embodiment of the present invention will be described below in detail with reference to the drawings.

Figure 1:
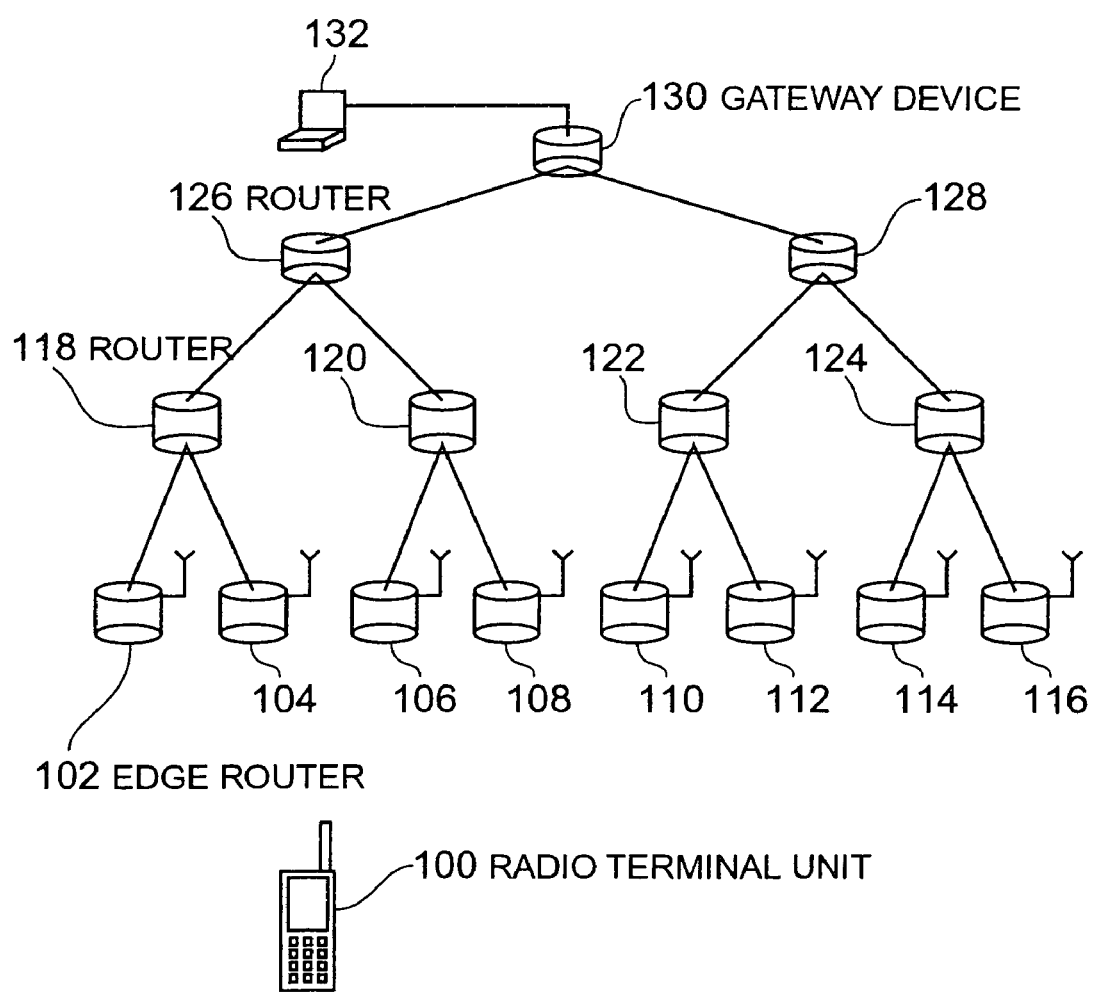
FIG. 1 is a block diagram showing a configuration of a mobile communication system according to an embodiment.

FIG. 1 is a block diagram showing a configuration of a mobile communication system according to an embodiment of the present invention.

This mobile communication system shown in FIG. 1 is comprised of a plurality of edge routers 102, 104, 106, 108, 110, 112, 114, 116 provided in respective base stations for radio communication with radio terminal unit 100 such as a cellular phone or the like, a plurality of routers 118, 120, 122, 124 connected above the edge routers 102-116, routers 126, 128 each connected above these routers 118-124, a gateway device 130 connected above each of the routers 126, 128, and a CN 132 which is a communication terminal unit of a correspondent party connected through a communication network to the gateway device 130.

Each of the edge routers 102-116 stores information about locations of edge routers mounted in base stations forming radio zones adjacent to a radio zone of a base station in which the edge router in question is mounted, and information about locations of superordinate routers to which these adjacent edge routers and the edge router in question are connected.

The features of the present embodiment in this configuration will be described below. For example, supposing the radio terminal unit 100 presently connected to the edge router 102 moves, it is expected from the location information stored in the edge router 102 before the movement that the edge router 104 will be a candidate for the destination of the movement and the radio terminal unit 100 will move to the edge router 104.

In this case, CORs are the superordinate routers 118 and 126 and gateway device 130 connected to the destination candidate edge router 104. Here a COR is a router under which all edge routers as potential handover destinations are located, and router on a path to the communication correspondent. In this case, the gateway device 130 can also be considered to be one router.

When there are a plurality of CORs as candidates as in this case, a relay router is specified out of the above CORs by making use of information about applications used by the user, the load on the network, radio technology, and so on. Here the relay router is a router as an origin of switching of path. Namely, location information of a radio terminal unit under command is registered in the relay router and data addressed to the radio terminal unit is tunneled at the relay router to be forwarded to the radio terminal unit.

If the information about the applications used by the user, the load on the network, the radio technology, etc. as described above is not available, a location update message can be received faster by locating the RR function in the COR closer to the radio terminal unit 100 (i.e., by determining the COR closer to the radio terminal unit 100 as a relay router). In this case, therefore, the router 118 being the COR closer to the radio terminal unit is specified as a relay router, out of the CORs where all the paths from the edge router 102 being the edge router before the movement of the radio terminal unit 100 and from the edge router 104 as a destination candidate to the CN 132 being the terminal unit of the correspondent party intersect, and the RR function is located in the router 118. Here the RR function (Regional Registration function) is a function of recording location information of radio terminal unit and forwarding data to a specific radio terminal unit on the basis of the location information.

In the next case where the radio terminal unit 100 is connected to the edge router 104, destination candidates are the edge routers 102 and 106. In this case, since the router 118 is connected above the edge router 102 and the router 120 is connected above the edge router 106, a common router connected to the both edge routers 102 and 106 is a much higher router 126. In this case, the router 126 and gateway device 130 are CORs where all the paths from the edge routers 102 and 106 to the CN 132 of the correspondent terminal unit intersect. If the number of destination edge routers can be narrowed down by making use of information about the direction of movement of the radio terminal unit 100, the condition of radio links, etc., the router 118 or 120 above each edge router 102 or 106 can also be defined as a candidate of COR.

Thereafter, the relay router is specified out of the above CORs by making use of the applications used by the user, the load on the network, the radio technology, etc. as described previously. If the information about the applications used by the user, the load on the network, the radio technology, etc. as described is not available, the router 126 being the COR closer to the radio terminal unit is specified as a relay router, out of the CORs where all the paths from the edge router 104 being the edge router before the movement of the radio terminal unit 100 and from each of the edge routers 102, 106 being the destination candidates to the CN 132 being the correspondent terminal unit intersect, and the RR function is located in the router 126.

Figure 2:
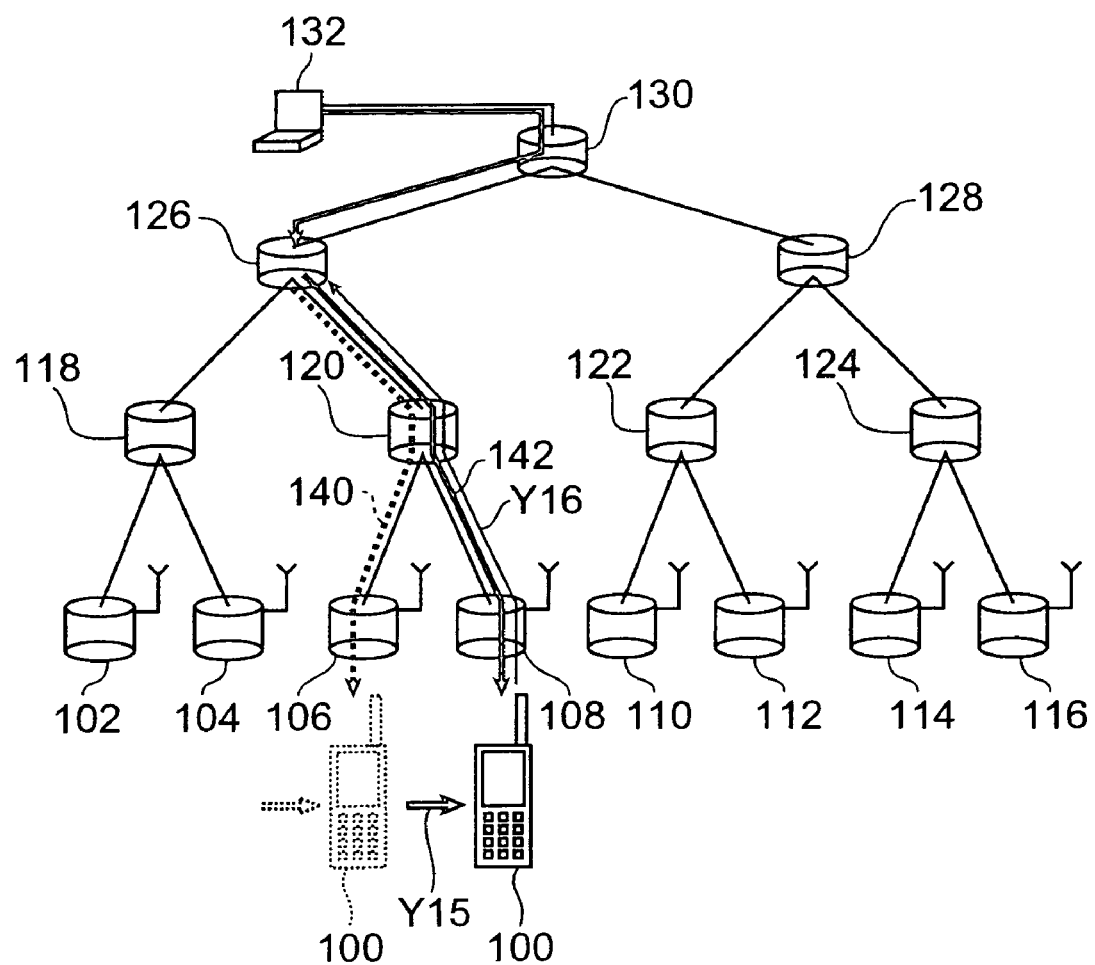
FIG. 2 is a block diagram for explaining an operation of handover in the mobile communication system according to the embodiment.

The handover operation of the radio terminal unit 100 with the RR function in a specific COR as a relay router as described above will be described with reference to FIG. 2.

The description will be given about a situation where the radio terminal unit 100 presently connected to the edge router 106 moves to the edge router 108 as indicated by an arrow Y15. When the radio terminal unit 100 is connected to the edge router 106, the destination candidates are the edge routers 104 and 108, and the router 126 is thus selected as a relay router; the CN 132 of the communication correspondent is notified of the location information of the router 126 being the relay router.

Thereafter, the radio terminal unit 100 moves to the edge router 108 and then sends a location change notification to the router 126 being the relay router. Then, without any change in the path from the CN 132 to the router 126, the path from the router 126 to the radio terminal unit 100 is switched from a path 140 via the edge router 106 to a path 142 via the edge router 108.

Since the location of the relay router herein is closer than the CN 132 of the communication correspondent, it also becomes feasible to decrease the time for location registration and thus decrease the time period necessary for the handover transaction.

After completion of the movement of the radio terminal unit 100 to under the edge router 108, the destination candidates thereafter are the edge routers 106 and 110, and the gateway device 130 is selected as a relay router. Since the selected gateway device 130 is different from the router 126 being the previous relay router before the movement, it is necessary to move the relay router from the router 126 to the gateway device 130. Therefore, the radio terminal unit 100 sends an RR instruction to the gateway device 130. Here the RR instruction (Regional Registration instruction) is an instruction to make a specific router function as a relay router.

Then the CN 132 of the communication correspondent is immediately notified that the gateway device 130 became a new relay router. This process is not carried out during the handover, but is carried out after completion of the handover transaction. However, packets are sent via the router 126 even during the period in which the CN 132 of the communication correspondent is notified that the relay router is the gateway device 130, and thus this process invokes no short break of communication. After the above notification to the CN 132, the path from CN 132 to the gateway device 130 is established and the path from the gateway device 130 to the radio terminal unit 100 is further established.

As described above, the mobile communication system of the present embodiment is constructed in the configuration wherein there are the routers 118-128 and gateway device 130 connected above the edge routers 102-116 provided in the respective base stations in the hierarchical structure and configured to perform the relaying of data to the base stations and wherein the router 126 being the COR closer to the radio terminal unit 100 is specified as a relay router, out of the CORs where all the paths from the edge router 104 before the movement of the radio terminal unit 100 and from each of all the edge routers 102, 106 being destination candidates to the CN 132 of the communication correspondent intersect.

This makes it feasible to specify the common relay router 126 to the edge router 104 presently under connection with the radio terminal unit 100 and the edge router 106 as a destination candidate, whereby the handover can be performed by only sending the location change notification to the specified relay router 126. Namely, the handover can be performed without sending the location change notification up to the CN 132 of the communication correspondent as before, so that the handover transaction time can be readily reduced.

The edge routers 102-116 each are provided with the function of storing the information about the edge routers mounted in the base stations forming the radio zones adjacent to the radio zone of the base station in which the edge router in question is mounted, and the information about the superordinate routers to which these adjacent edge routers and edge router in question are connected, and specifying the router where all the paths intersect, as a COR from the stored information. This makes it feasible to readily specify the COR.

Since the edge router 102-116 notifies the radio terminal unit 100 registered in the edge router, of the information of the relay router, the radio terminal unit 100 can access the relay router through the destination edge router during the period of the handover.

The RR function is located in the router 126 being the COR closer to the radio terminal unit 100, as a relay router, and the communication correspondent of the radio terminal unit 100 is notified of the location information of the relay router 126 where the RR function is located. Through this operation, the communication correspondent is preliminarily notified of the location to the relay router in which the location registration relaying function is located, and the radio terminal unit can change the location by simply sending a location registration request to the relay router to update the path after movement; therefore, the handover transaction time can be reduced, as compared with the case where the location change notification is sent to the communication correspondent.

If after the movement of the radio terminal unit 100 from the edge router 106 to the edge router 108, the specified relay router 126 is different from the relay router before the movement, the location registration relaying function is located in another relay router 130; therefore, the location registration relaying point can be properly changed after the movement of the radio terminal unit 100.

In addition, the number of edge routers as potential destinations can be narrowed down if the information about radio links, the information about the moving direction of the terminal, or the like is available; then the relay router as a relay node can be located at a COR closer to the terminal, whereby the handover transaction time can be reduced more.

In the future, the radio resources are expected to become more stringent, for example, because the frequency bands become higher, so as to narrow the area covered by one base station. Under such circumstances, if the time for each handover transaction can be reduced, the overlap zone can be narrowed and it can lead to effective utilization of the radio resources.

The mobile communication system in the above embodiment was constructed in the configuration wherein the radio terminal unit 100 was notified of the information about the relay router, the radio terminal unit 100 sent the RR instruction to the COR specified as the relay router, on the basis of the information, and the COR provided the RR function on the basis of the RR instruction transmitted from the radio terminal unit 100. However, this may be modified into such a configuration that the edge router transmits the RR instruction to the COR specified as the relay router and the COR provides the RR function on the basis of the RR instruction transmitted from the edge router. The handover operation in the case adopting this configuration will be described below.

Figure 3:
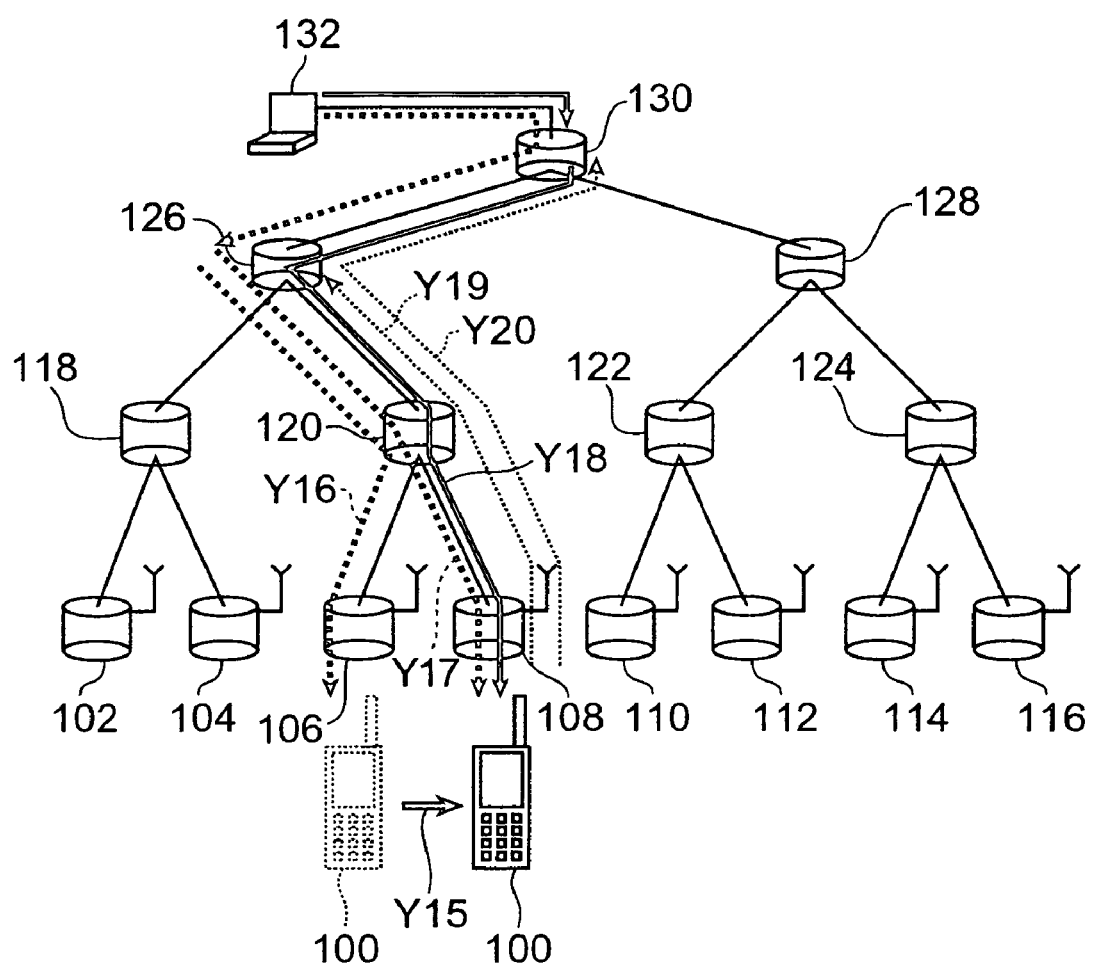
FIG. 3 is a block diagram for explaining another operation of handover in the mobile communication system according to the embodiment.
Figure 4:
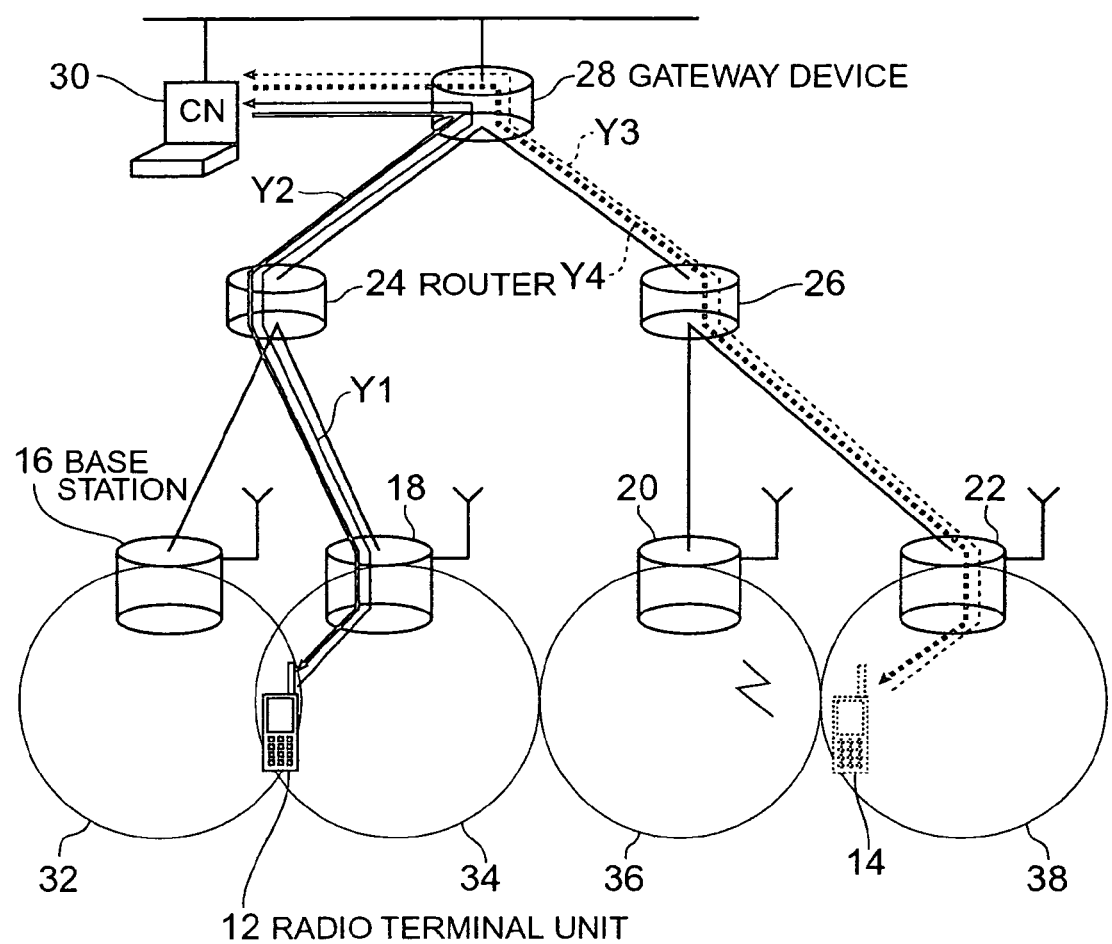
FIG. 4 is a block diagram for explaining the general handover operation in the conventional mobile communication system.
Figure 5:
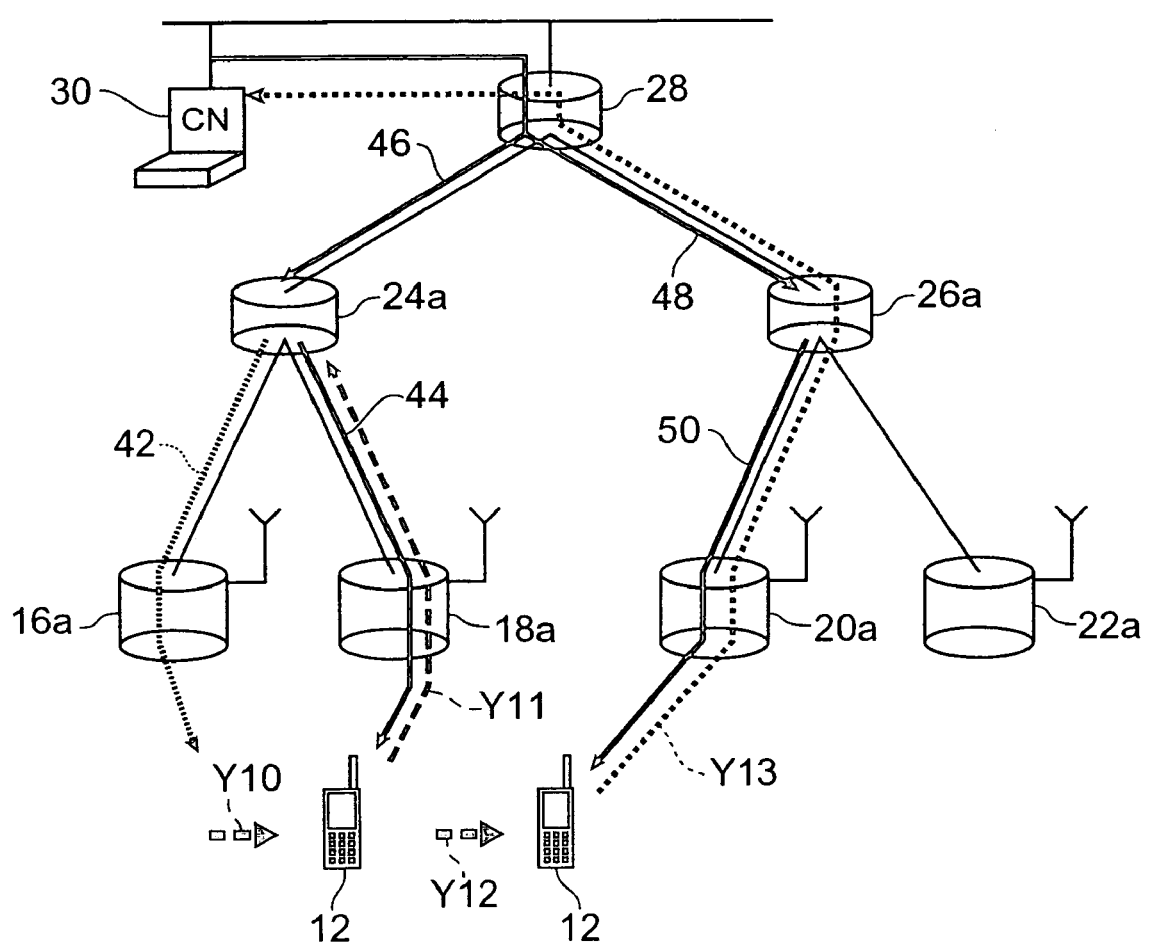
FIG. 5 is another block diagram for explaining the handover operation for decrease of the handover transaction time in the conventional mobile communication system.

FIG. 3 is a block diagram for explaining the handover operation in the case adopting the above configuration. In the present configuration, the information about relay routers corresponding to the respective edge routers 102-116 is preliminarily stored in each of the edge routers 102-116.

For example, speaking of the edge router 106, destination candidates for movement of the mobile terminal unit 100 under the edge router 106 are the edge routers 104, 108 from the network configuration (including the location information) shown in FIG. 3. Therefore, the router 126 closer to the radio terminal unit 100 is specified as a relay router, out of the CORs (router 126 and gateway device 130) where all the paths from the edge router 106 before the movement and from each of the edge routers 104, 108 as destination candidates to the CN 132 intersect. In this case, the information that the router 126 was specified as a relay router is recorded in the edge router 106.

Speaking of the edge router 108, destination candidates for movement of the mobile terminal unit 100 under the edge router 108 are the edge routers 106, 110 from the network configuration (including the location information) shown in FIG. 3. Therefore, the gateway device 130, which is a COR where all the paths from the edge router 108 before the movement and from each of the edge routers 106, 110 as destination candidates to the CN 132 of the communication correspondent intersect, is specified as a relay router. In this case, the information that the gateway device 130 was specified as a relay router is recorded in the edge router 108.

Under such circumstances, suppose the radio terminal unit 100 moves from under the edge router 106 to under the edge router 108, as indicated by an arrow Y15.

When the radio terminal unit 100 moves from under the edge router 106 to under the edge router 108, the edge router 108 transmits a location change notification (Y19) to the router 126 being the old relay router to reroute the path from Y16 to Y17, in order to change the path between the radio terminal unit 100 having moved from the edge router 106 and the CN 132 of the communication correspondent.

Subsequently, the edge router 108 transmits an RR instruction (Y20) to the gateway device 130 specified as a relay router, on the basis of the information of the relay router preliminarily recorded, to reroute the path from Y17 to Y18. The gateway device 130, receiving the RR instruction, provides the RR function from then on as a relay router.

This configuration obviates the need for notifying the radio terminal unit 100 of the information of the relay router and for informing the user (radio terminal unit 100) of the network configuration, and thus the network configuration can be blocked off.

INDUSTRIAL APPLICABILITY

The present invention is applicable to mobile communication systems and, particularly, to the handover control apparatus, radio terminal unit, edge routers, routers, and handover control methods in the mobile communication systems.

The invention claimed is:

1. A handover control apparatus for controlling handover of a radio terminal unit between edge routers provided in respective base stations for radio communication with a radio terminal unit and to which routers are connected above in a hierarchical structure, said handover control apparatus comprising:
   a controller configured to specify a relay router from a plurality of Cross Over Routers (CORs) where all paths from an edge router before movement of the radio terminal unit and from every edge router as a candidate for a destination of the movement to a communication correspondent intersect, wherein
   each of said edge routers are configured to store information about edge routers mounted in base stations forming radio zones adjacent to a radio zone of a base station in which the edge router before movement of the radio terminal is mounted, and information about superordinate routers to which the adjacent edge routers and the edge router before movement of the radio terminal are connected, and
   said controller is configured to specify the relay router from the plurality of CORs on the basis of the stored information.

2. The handover control apparatus according to claim 1, wherein the controller is configured to notify the radio terminal unit registered in the edge router of information about the relay router.

3. A radio terminal unit configured to, on the basis of the information about the relay router notified of by the handover control apparatus as set forth in claim 2, transmit a Regional Registration (RR) instruction to the COR specified as the relay router by the handover control apparatus.

4. A router configured to provide an RR function on the basis of the RR instruction transmitted from the radio terminal unit as set forth in claim 3.

5. The handover control apparatus according to claim 2, wherein the controller is configured to locate a location registration relaying function in said COR as a relay router, and notify the communication correspondent of the radio terminal unit of information about a location of the relay router where the location registration relaying function is located.

6. The handover control apparatus according to claim 5, wherein after completion of the handover of the radio terminal unit and in timing different from that of the handover, where the specified relay router is different from the relay router before the movement, the controller is configured to locate the location registration relaying function in another relay router and data is continuously forwarded from the relay router before the movement.

7. The handover control apparatus according to claim 1, wherein the controller is configured to notify the edge router of the information about the relay router.

8. An edge router configured to, on the basis of the information about the relay router notified of by the handover control apparatus as set forth in claim 7, transmit an RR instruction to the COR specified as a relay router by the handover control apparatus.

9. A router configured to provide an RR function on the basis of the RR instruction transmitted from the edge router as set forth in claim 8.

10. A mobile communication system for implementing handover of a radio terminal unit between base stations, said mobile communication system comprising:
routers connected above the base stations in a hierarchical structure and configured to perform relaying of data to the base stations; and
edge routers provided in the respective base stations, each edge router configured to specify a relay router from a plurality of Cross Over Routers (CORs) where all paths from a base station before movement of the radio terminal unit and from every base station as a candidate for a destination of the movement to a communication correspondent intersect,
wherein each of said edge routers are configured to store information about edge routers mounted in base stations forming radio zones adjacent to a radio zone of the base station before movement of the radio terminal unit, and information about superordinate routers to which the adjacent edge routers and an edge router mounted in the base station before movement of the radio terminal unit are connected, and wherein the relay router is specified from the plurality of CORs on the basis of the stored information.

11. The mobile communication system according to claim 10, wherein said edge router is configured to notify the radio terminal unit registered in the edge router of information about the relay router.

12. The mobile communication system according to claim 11, wherein the radio terminal unit is configured to transmit a Regional Registration (RR) instruction to the COR specified as the relay router based on the information about the relay router notified of by the edge router.

13. The mobile communication system according to claim 12, wherein the COR specified as the relay router provides an RR function on the basis of the RR instruction transmitted from the radio terminal unit.

14. The mobile communication system according to claim 11, wherein a location registration relaying function is located in said COR as a relay router and wherein the communication correspondent of the radio terminal unit is notified of information about a location of the relay router where the location registration relaying function is located.

15. The mobile communication system according to claim 14, wherein after completion of the handover of the radio terminal unit and in timing different from that of the handover, where the specified relay router is different from the relay router before the movement, the location registration relaying function is located in another relay router and data is also continuously forwarded from the relay router before the movement.

16. The mobile communication system according to claim 11, wherein the edge router is configured to transmit a RR instruction to the COR specified as the relay router.

17. The mobile communication system according to claim 16, wherein the COR specified as the relay router provides an RR function on the basis of the RR instruction transmitted from the edge router.

18. A handover control method of controlling handover of a radio terminal unit between edge routers provided in respective base stations for radio communication with radio terminal unit and to which routers are connected above in a hierarchical structure, said handover control method comprising:
a control step of specifying a relay router from a plurality of Cross Over Routers (CORs) where all paths from an edge router before movement of the radio terminal unit and from every edge router as a candidate for a destination of the movement to a communication correspondent intersect,
a storage step wherein each of said edge routers stores information about edge routers mounted in base stations forming radio zones adjacent to a radio zone of a base station in which the edge router before movement of the radio terminal unit is mounted, and information about superordinate routers to which the adjacent edge routers and the edge router before movement of the radio terminal unit are connected, and
wherein said control step further comprises specifying the relay router from the plurality of CORs on the basis of the information stored in the storage step.

19. The handover control method according to claim 18, wherein said control step further comprises notifying the radio terminal unit registered in the edge router of information about the relay router.

20. The handover control method according to claim 19, further comprising:
transmitting, from the radio terminal unit, a Regional Registration (RR) instruction to the COR specified as the relay router based on the information about the relay router notified of by the edge router.

21. The handover control method according to claim 20, further comprising:
providing, from the COR specified as the relay router, a RR function on the basis of the RR instruction transmitted from the radio terminal unit.

22. The handover control method according to claim 19, wherein said control step further comprises locating a location registration relaying function in said COR as a relay router, and notifying the communication correspondent of the radio terminal unit of information about a location of the relay router where the location registration relaying function is located.

23. The handover control method according to claim 22, wherein after completion of the handover of the radio terminal unit and in timing different from that of the handover, where the specified relay router is different from the relay router before the movement, said control step further comprises locating the location registration relaying function in another relay router and continuously forward data from the relay router before the movement.

24. The handover control method according to claim 18, further comprising:
transmitting, from the edge router, a RR instruction to the COR specified as the relay router.

25. The handover control method according to claim 24, further comprising:
providing, from the COR specified as the relay router, a RR function on the basis of the RR instruction transmitted from the edge router.

* * * * *